(12) United States Patent
Bourdev

(10) Patent No.: US 7,813,557 B1
(45) Date of Patent: Oct. 12, 2010

(54) TAGGING DETECTED OBJECTS

(75) Inventor: Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 945 days.

(21) Appl. No.: 11/341,246

(22) Filed: Jan. 26, 2006

(51) Int. Cl.
G06K 9/56 (2006.01)

(52) U.S. Cl. .................................................... 382/205

(58) Field of Classification Search ................. 345/619; 382/118, 170, 173
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 | 1/2001 | Niblack et al. | |
| 6,324,555 B1 | 11/2001 | Sites | |
| 6,366,296 B1 | 4/2002 | Boreczky et al. | |
| 6,714,672 B1 | 3/2004 | Berestov et al. | |
| 6,721,733 B2 | 4/2004 | Lipson et al. | |
| 6,728,728 B2 | 4/2004 | Spiegler et al. | |
| 6,879,709 B2 | 4/2005 | Tran et al. | |
| 6,940,545 B1 | 9/2005 | Ray et al. | |
| 7,155,036 B2 | 12/2006 | Li | |
| 7,171,023 B2 | 1/2007 | Kim et al. | |
| 7,171,630 B2 | 1/2007 | O'Leary et al. | |
| 7,203,367 B2 | 4/2007 | Shniberg et al. | |
| 7,274,832 B2 | 9/2007 | Nicponski | |
| 7,343,365 B2 | 3/2008 | Farnham et al. | |
| 7,403,642 B2 | 7/2008 | Zhang et al. | |
| 7,477,805 B2 | 1/2009 | Ohtsuka et al. | |
| 7,519,200 B2 | 4/2009 | Gokturk et al. | |
| 7,564,994 B1 | 7/2009 | Steinberg et al. | |
| 7,587,101 B1 * | 9/2009 | Bourdev ..................... 382/291 |
| 2001/0053292 A1 * | 12/2001 | Nakamura .................. 396/661 |
| 2002/0054059 A1 | 5/2002 | Schneiderman | |
| 2002/0074398 A1 | 6/2002 | Lancos et al. | |
| 2002/0103813 A1 * | 8/2002 | Frigon ..................... 707/104.1 |
| 2003/0023754 A1 | 1/2003 | Eichstadt et al. | |
| 2003/0033296 A1 | 2/2003 | Rothmuller et al. | |
| 2003/0158855 A1 | 8/2003 | Farnham et al. | |
| 2003/0210808 A1 * | 11/2003 | Chen et al. ................... 382/118 |
| 2004/0008906 A1 | 1/2004 | Webb | |
| 2004/0017930 A1 | 1/2004 | Kim et al. | |
| 2004/0060976 A1 | 4/2004 | Blazey et al. | |
| 2004/0064455 A1 | 4/2004 | Rosenzweig et al. | |
| 2004/0101212 A1 | 5/2004 | Fedorovskaya et al. | |
| 2004/0204635 A1 | 10/2004 | Scharf et al. | |

(Continued)

OTHER PUBLICATIONS

Yang et al. "Detecting Faces in Images: A Survey." IEEE Transactions of Pattern Analysis and Machine Intelligence, vol. 4, No. 1. Jan. 2003. pp. 34-58.

(Continued)

*Primary Examiner*—Bhavesh M Mehta
*Assistant Examiner*—Nirav G Patel
(74) *Attorney, Agent, or Firm*—Van Pelt, Yi & James LLP

(57) ABSTRACT

Assigning a tag to an object is disclosed. Assigning includes displaying a set of one or more objects, wherein each object has been detected from an image, receiving an indication to tag an object in the set, and assigning a tag to the object.

23 Claims, 16 Drawing Sheets

U.S. PATENT DOCUMENTS

| | | | |
|---|---|---|---|
| 2004/0267612 | A1 | 12/2004 | Veach |
| 2005/0011959 | A1* | 1/2005 | Grosvenor ............ 235/470 |
| 2005/0013488 | A1 | 1/2005 | Hasimoto et al. |
| 2005/0025376 | A1 | 2/2005 | Ishida |
| 2005/0041114 | A1 | 2/2005 | Kagaya |
| 2005/0046730 | A1 | 3/2005 | Li |
| 2005/0050027 | A1 | 3/2005 | Yeh et al. |
| 2005/0063568 | A1 | 3/2005 | Sun et al. |
| 2005/0105779 | A1 | 5/2005 | Kamei |
| 2005/0105806 | A1 | 5/2005 | Nagaoka et al. |
| 2005/0117870 | A1 | 6/2005 | Lee |
| 2005/0128221 | A1* | 6/2005 | Aratani et al. ............ 345/619 |
| 2005/0129276 | A1* | 6/2005 | Haynes et al. ............ 382/103 |
| 2005/0147302 | A1 | 7/2005 | Leung |
| 2005/0157952 | A1 | 7/2005 | Gohda et al. |
| 2005/0172215 | A1 | 8/2005 | Squibbs et al. |
| 2005/0196069 | A1 | 9/2005 | Yonaha |
| 2005/0207630 | A1* | 9/2005 | Chan et al. ............ 382/131 |
| 2005/0213793 | A1 | 9/2005 | Oya et al. |
| 2005/0285943 | A1 | 12/2005 | Cutler |
| 2006/0008145 | A1* | 1/2006 | Kaku ............ 382/173 |
| 2006/0008152 | A1 | 1/2006 | Kumar et al. |
| 2006/0032916 | A1 | 2/2006 | Mueller et al. |
| 2006/0050934 | A1 | 3/2006 | Asai |
| 2006/0053364 | A1 | 3/2006 | Hollander et al. |
| 2006/0071942 | A1 | 4/2006 | Ubillos et al. |
| 2006/0098737 | A1 | 5/2006 | Sethuraman et al. |
| 2006/0120572 | A1 | 6/2006 | Li et al. |
| 2006/0140455 | A1 | 6/2006 | Costache et al. |
| 2006/0161588 | A1 | 7/2006 | Nomoto |
| 2006/0171573 | A1* | 8/2006 | Rogers ............ 382/128 |
| 2006/0222243 | A1 | 10/2006 | Newell et al. |
| 2006/0239515 | A1* | 10/2006 | Zhang et al. ............ 382/118 |
| 2006/0251338 | A1 | 11/2006 | Gokturk et al. |
| 2006/0251339 | A1 | 11/2006 | Gokturk et al. |
| 2007/0071323 | A1 | 3/2007 | Kontsevich et al. |
| 2007/0081744 | A1 | 4/2007 | Gokturk et al. |
| 2007/0098303 | A1 | 5/2007 | Gallagher et al. |
| 2007/0183638 | A1 | 8/2007 | Nakamura |
| 2007/0242856 | A1 | 10/2007 | Suzuki et al. |
| 2008/0080745 | A1 | 4/2008 | Vanhoucke et al. |
| 2009/0016576 | A1 | 1/2009 | Goh et al. |
| 2009/0160618 | A1 | 6/2009 | Kumagai et al. |

OTHER PUBLICATIONS

Schneiderman, Henry. "A Statistical Approach to 3D Object Detection." Robotics Institute, Carnegie Mellon University, Pittsburgh, PA. 2000.

U.S. Appl. No. 11/097,951, Newell et al.

Pentland et al. (Jun. 1996) "Photobook: Content-based manipulation of image databases," Int'l J. Computer Vision, vol. 18 No. 3, pp. 233-254.

Ma et al. (Sep. 2000) "An indexing and browsing system for home vido," Proc. 2000 European Signal Processing Conf., pp. 131-134.

"Notes and Tags". p. 3 pf 6. http://www.flickr.com/learn_more_3.gne , Jan. 4, 2006.

Riya—Photo Search. http://www.riya.com , Dec. 7, 2005.

Riya—Photo Search. http://www.riya.com/corp/learn-more.jsp , Dec. 7, 2005.

Riya—Photo Search. http://www.riya.com/corp/learn-more-s2.jsp , Dec. 7, 2005.

Riya—Photo Search. http://www.riya.com/corp/learn-more-s3.jsp , Dec. 7, 2005.

Riya—Photo Search. http://www.riya.com/corp/learn-more-s5.jsp , Dec. 7, 2005.

Riya—Photo Search. http://www.riya.com/corp/learn-more-s6.jsp , Dec. 7, 2005.

Gormish, Michael J.. "JPEG 2000: Worth the Wait?" Ricoh Silicon Valley, Inc. pp. 1-4., Published in 1999.

Sun et al. "Quantized Wavelet Features and Support Vector Machines for On-Road Vehicle Detection." Dept. of Computer Science, U. of Nevada, Reno & e-Technology Dept., Ford Motor Company, Dearborn, MI. pp. 1-6., Published in 2002.

Yang, Ming-Hsuan. "Recent Advances in Face Detection." Honda Research Institute, Mountain View, CA., 2003 Tutorial.

Jennifer Granick, "Face It: Privacy Is Endangered", Dec. 7, 2005.

Michael Arrington, "First Screen Shots of Riya". Oct. 26, 2005.

Cox et al., "The Bayesian image retrieval system, PicHunter: theory, implementation, and psychochysical experiments," IEEE Trans. on Image Processing, Jan. 2000, vol. 9 No. 1, pp. 20-37.

Nakazato et al., "ImageGrouper: a group-oriented user interface for content-based image retrieval and digital image arragnement," J. Visual Languages and Computing, Aug. 2003, vol. 14 No. 4, pp. 363-386.

Girgensohn et al., "Leveraging face recognition technology to find and organize photos," Proc. 6th ACM SIGMM Int'l Workshop on Multimedia Information Retrieval, Oct. 2004, pp. 99-106.

* cited by examiner

TAGGING DETECTED OBJECTS

BACKGROUND OF THE INVENTION

Automatic detection techniques can be used to detect objects in an image. For example, a face detection process can detect faces of people in an image. With digital cameras becoming increasingly popular, more and more digital images are being created for personal and commercial use. Face detection technology can be applied to these digital images to detect faces. However, existing methods for handling faces once they have been detected are limited. Improved techniques for managing faces or other objects resulting from a detection process would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
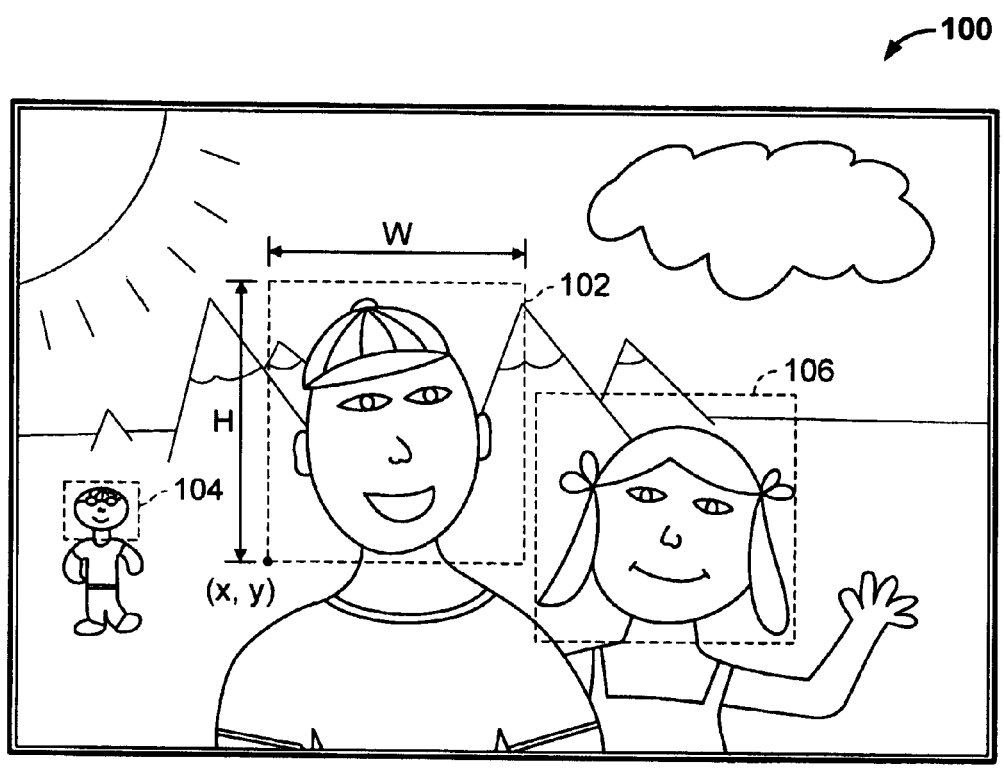
FIG. 1A is an embodiment of an image including objects resulting from a detection process.

FIG. 1A is an embodiment of an image including objects resulting from a detection process. In the example shown, image 100 may be a file in a variety of formats, including Joint Photographic Experts Group (JPEG), Graphics Interchange Format (GIF), Tagged Image File Format (TIFF), and Portable Network Graphics (PNG). In some embodiments, image 100 is generated using a digital camera. Although images may be described in the examples herein, any data, including audio, video, streaming video, or graphical data, may be used in various embodiments. For example image 100 may be a frame of video.

Automatic detection processing is performed on image 100. Automatic detection processing detects occurrences of a detection object in an image. Automatic detection processing may be performed using various techniques in various embodiments. For example, Eigenfaces, Adaboost, or neural networks may be used. A two dimensional pattern matching technique may be used. A three dimensional model of the object may be used to approximate the object. Detection may be performed based on the model. Adobe® Photoshop® Elements may be used to perform automatic face detection on photographs.

Objects are output by the automatic detection process and are believed by the automatic detection process to include an occurrence of the detection object. Automatic detection processes may not necessarily attempt to detect a particular detection object (for example, the face of a particular person). Rather, the process may attempt to detect any occurrence of a detection object in an image (for example, any face). In some embodiments, including this example, each object includes one and only one occurrence of a detection object. Examples of detection objects include a face, person, animal, car, boat, book, table, tree, mountain, etc.

An object resulting from a detection process may be referred to as a "detected object" or an "object that has been detected from an image." A detected object may include (an occurrence of) a detection object. As used herein, "face" may refer to either an object that includes a face or a face as a detection object (i.e., a face that is shown in an object).

Objects may be associated with a subimage (i.e., a portion of an image) and may be described in a variety of ways. In this example, objects are approximated with a rectangle. In some embodiments, objects output by an automatic detection process have a different shape, such as a round shape. Object 102 may be described by coordinates (x, y). Coordinates (x, y) may describe the location of the lower left corner of object 102 with respect to the origin (i.e., lower left corner of image 100). Any appropriate unit may be used for coordinates (x, y). Object 102 in this example is also described by a height, H, and a width, W. In some embodiments, objects output by an automatic detection process have a fixed aspect ratio (i.e., a fixed width to height ratio). For example, although the sizes of objects 102 and 104 are different, the aspect ratios of the two objects may be the same.

Additional information associated with each object may be output by an automatic detection process. In some embodiments, a probability that a given object includes the detection object is output. For example, object 106 may be associated with a probability that object 106 includes a face. In some embodiments, one or more angles are output by an automatic detection process. For example, one angle may describe the rotation of the detection object in the image plane (face tilted side-to-side), a second angle—in the 3D space along the vertical axis (frontal vs. profile face, or a rotation) and a third angle—in the 3D space along the horizontal axis (face looking up or down, or a tilt up or down).

Automatic detection processes can be imperfect. Sometimes, an automatic detection process may not be able detect an occurrence of a detection object. For example, some face detection processes may not be able to detect the face of a person if the face is too small in an image. An automatic detection process can also generate "false alarms." A face detection process may output an object that does not include a face.

In some embodiments, additional processes may be applied to image 100 or an associated object after automatic detection is performed. For example, a face identification process may be performed where objects are evaluated to determine whether they contain the face of a particular person. Objects may be identified in various ways in various embodiments. For example, a technique based on Adaboost, Linear Discriminant Analysis (LDA), or principal component analysis (PCA) may be used to perform object identification. In some embodiments, a face that is identified is automatically tagged. Face identification may be imperfect. For example, a face may be misidentified or mistagged. In some embodiments, a probability that the face is identified correctly is provided. In some embodiments, a face matching process is performed, where multiple objects from multiple images are compared and similar faces are matched together. In some embodiments, a process generates a new object or modifies an existing object. For example, the aspect ratio of an object may be adjusted.

Object detection may be automatic or manual. A user may examine an image, detect an occurrence of a detection object, and specify the portion of the image associated with the new object. For example, a user may have drawn a box around any of faces 102, 104, and 106 to detect a face. The output of a manual detection process may include the same information as the output of an automatic detection process. The probability that a manually detected object includes the detection object may be set to 1.

Table 1 lists examples of information that may be stored for various objects. This information may be output by an object detector. In this example, objects 1-5 were automatically detected and object 6 was manually detected. Such information may be stored in one or more of a database, file metadata, file, or in any other appropriate way.

TABLE 1

| Object ID | Source File ID | Coordinates of Origin | Width | Height | Angle | P(Object = Detection Object) | Date Object Detected | Manually or Automatically Detected | Identity Confirmed? |
|---|---|---|---|---|---|---|---|---|---|
| 1 | 1 | x0, y0 | 5 | 8 | 0 | 0.8 | Jan. 1, 2005 | Automatically | yes |
| 2 | 1 | x1, y1 | 5 | 7 | 5 | 0.7 | Jan. 1, 2005 | Automatically | yes |
| 3 | 1 | x2, y2 | 1 | 1 | 0 | 0.5 | Jan. 1, 2005 | Automatically | no |
| 4 | 2 | x3, y3 | 2 | 2 | 0 | 0.6 | Nov. 2, 2005 | Automatically | yes |
| 5 | 2 | x4, y4 | 3 | 4 | 20 | 0.7 | Nov. 3, 2005 | Automatically | yes |
| 6 | 2 | x5, y5 | 1 | 1 | 0 | 1 | Nov. 22, 2005 | User | |

Figure 1B:
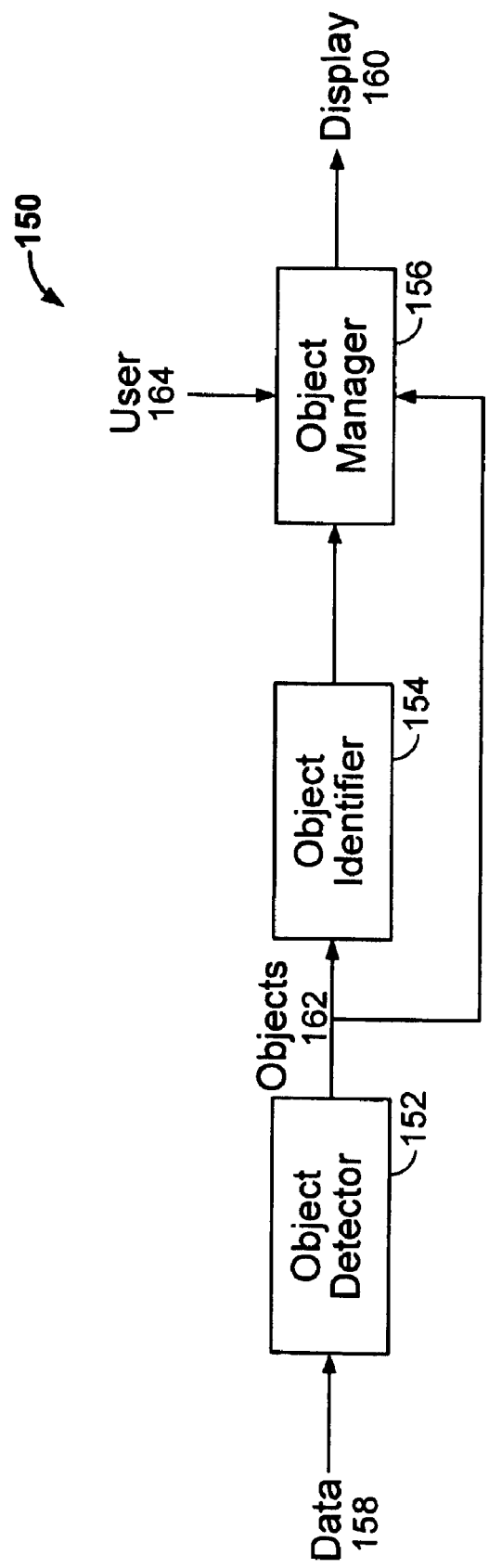
FIG. 1B is a block diagram illustrating an embodiment of a system for detecting and processing objects.

FIG. 1B is a block diagram illustrating an embodiment of a system for detecting and processing objects. In this example, system 150 includes object detector 152, object identifier 154, and object manager 156. Data 158 is input to object detector 152. Data 158 may include an image, video, audio clip, and/or other data. Object detector 152 performs an object detection process to detect occurrences of detection objects in data 158. Object detector 152 may detect any occurrence of a detection object (e.g., any face). Object detector 152 provides detected objects 162 as output.

Objects 162 are provided as input to object identifier 154, which identifies detection objects. For example, object detector 152 may detect any face, and object identifier 154 may identify the face as belonging to a specific person. Object identifier may output one or more names associated with one or more of objects 162. In some embodiments, object identifier 154 assigns a tag (such as the tag "Bob") to an object. Objects 162 and the output of object identifier 154 are provided as input to object manager 156. User input 164 may also be provided as input to object manager 156. In some embodiments, system 150 does not include object identifier 154.

Object manager 156 manages objects 162, including organizing, tagging, and displaying information associated with objects 162 on display 160. For example, object manager 156 may manage the tagging of objects, including assigning, storing, and obtaining tag information, including tag icons. Object manager 156 may manage the display of detected objects and other information. For example, object manager 156 may normalize detected objects, convey grouping of objects, or indicate tags with visual data, as more fully described below.

Figure 2:
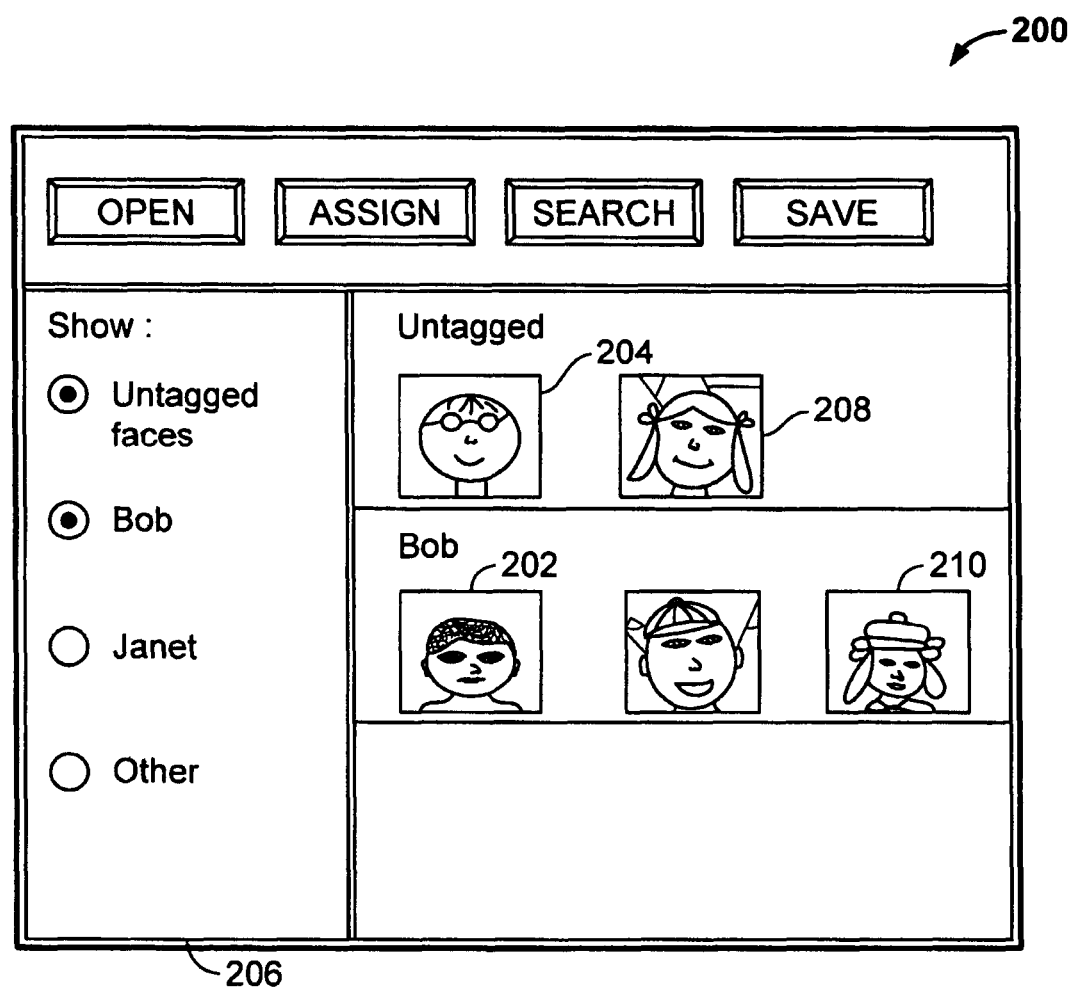
FIG. 2 illustrates an embodiment of an interface for viewing objects.

FIG. 2 illustrates an embodiment of an interface for viewing objects. In the example shown, interface 200 displays objects resulting from face detection performed on images. Some of the objects in this example are tagged while other objects are untagged. Object 202, for example, has been assigned a tag of "Bob" while object 204 is untagged. Object 210, which may include someone other than Bob (e.g., Janet), may have been mistagged, perhaps by a user or a face identification process. Interface 200 may be used to tag faces or other objects. Interface 200 may include results from a search query.

Tagging refers to the process of assigning a tag to an object or image. A user or an automatic process may assign a tag. A tag includes tag data. Tag data may be user specified or machine specified. Examples of tag data include a name, place, event, date, etc. A tag may represent descriptive information associated with an object or image. For example, a vacation photographed may be tagged with "Boston," "Mom," or "Fourth of July." Tag data may include any type of data, including text, image, audio, or video. Tag data may include free form text or keywords. The same tag may be assigned to more than one object and/or image. An object or image may have multiple tags.

In some embodiments, the output of an object detector includes tag data for an object. For example, the coordinates of an object may be considered tag data for an object. In some embodiments, the output of an object identifier includes tag data for an object, where the tag data includes a name. In some embodiments, a tag may be designated as a particular type of tag, such as a name tag. A name tag may be assigned to an object that includes a face.

Table 2 lists examples of information that may be stored for various tags. Such information may be stored in one or more of a database, file metadata, file, or in any other appropriate way.

Figure 3:
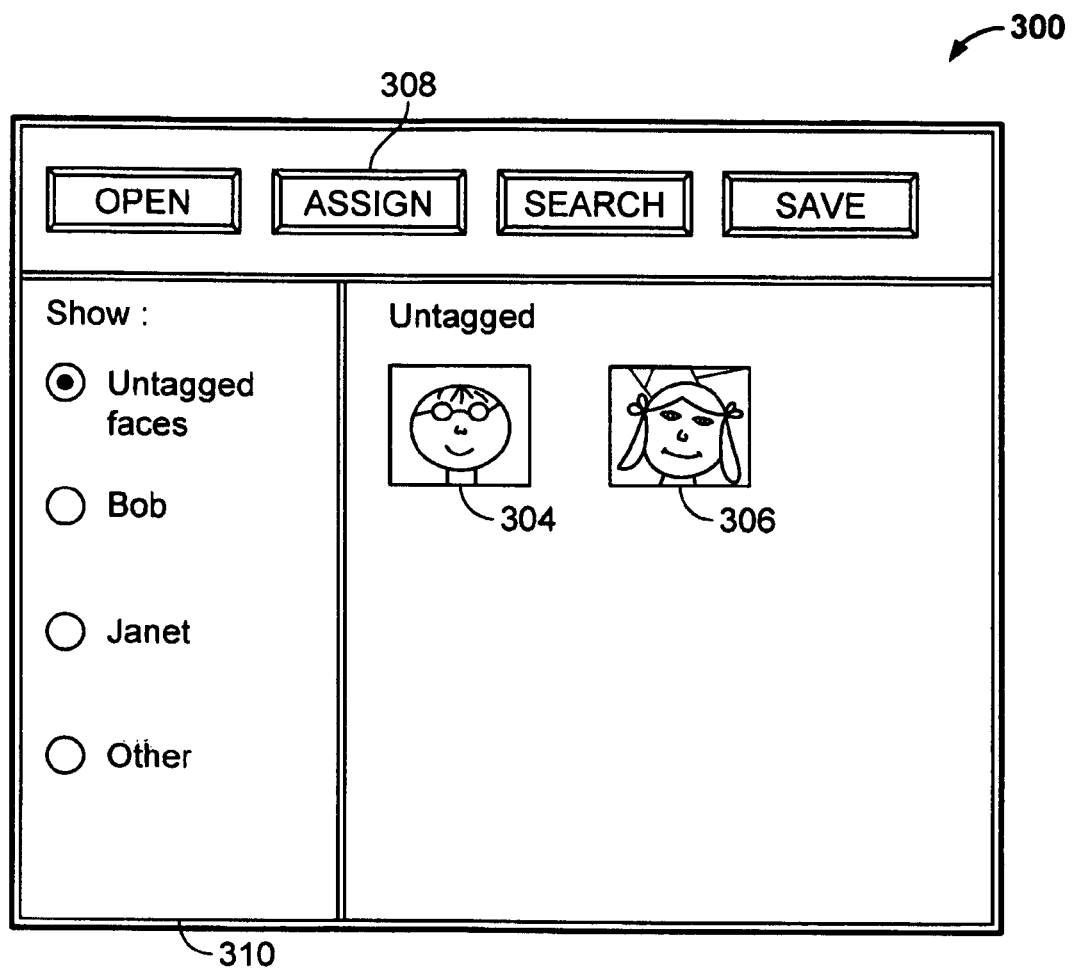
FIG. 3 illustrates an embodiment of an interface for tagging objects.

FIG. 3 illustrates an embodiment of an interface for viewing objects. In the example shown, interface 300 displays objects resulting from face detection performed on images. Objects that are untagged are shown in this example. In this example, two untagged objects are displayed. Any number of untagged objects may be displayed. In some embodiments, interface 300 shows interface 200 when the show "untagged faces" option is selected.

One or more objects may be selected and tagged. To select objects to be tagged, an input device may be used to interact with interface 300. The input device can be a mouse, a stylus, a touch sensitive display, or any pointing device. Using an input device, one or more objects may be selected from the objects displayed in interface 300. For example, by placing a mouse cursor over object 304 and clicking the mouse, object 304 may be selected. Clicking an object may toggle the object between a selected and an unselected state. If a user clicks object 306 after selecting object 304 (e.g., while holding down the "Ctrl" button), object 306 is selected in addition to object 304. Clicking a mouse cursor above object 306 one more time unselects object 306. In some cases, multiple objects are selected and tagged. In other cases, a single object

TABLE 2

| Tag ID | Tag Data | Object(s) Being Tagged | P(Object = Tag Data) | User or Machine Assigned | User or Machine Specified Tag Data | Tag Icon or Object ID to Use for Tag Icon |
|---|---|---|---|---|---|---|
| 1 | Bob | 1, 6 | 0.6, 1 | Machine, User | User | Object ID 1 |
| 2 | Janet | 4 | 0.5 | User | User | Object ID 2 |
| 3 | teeth | 1 | 1 | User | User | icon1.jpg |
| 4 | hat | 1 | 1 | User | User | icon2.jpg |
| 5 | mountains | 1, 2, 3 | 0.8, 0.7, 1 | Machine, Machine, User | Machine | icon3.jpg |

In the example of Table 2, tag 1 (having tag data "Bob") has been assigned to object 1 and object 6. The probability that object 1 includes Bob is 0.6. The probability that object 6 includes Bob is 1. For example, a face detection process may have output object 1 and a user may have generated object 6. A user is assumed to detect faces without any errors, while a face detection process may be imperfect. The tag data "Bob" is obtained from the user and the value in the sixth column indicates this. The tag icon to use for tag 1 is set to object ID 1. The tag icon is more fully described below.

Tags may be organized hierarchically. For example, tags may be organized into categories and subcategories. Examples of categories include people, places, and events. Subcategories might include family, USA, and sports. In some embodiments, side bar 206 displays tags hierarchically. For example, "people" may be displayed in the first line and "family" may be displayed as indented in the second line.

In some embodiments, objects, images, video, and/or audio may be organized into collections. For example, photos to use in a slideshow may form a collection. A collection tag may be a particular type of tag. Collections may be displayed in side bar 206.

In some embodiments, the interface used varies from that of interface 200. For example, an interface may have no concept of tags, and an interface may not necessarily display objects based on a tag. Faces 202 and 204 may, for example, be displayed based on a date. The date may be the date a photograph is taken, or may be the date automatic detection is performed.

is selected and tagged. Objects can be selected based on a criterion. For example, the criterion may be to select and tag all objects associated with certain images.

In this example, object 306 is selected and tagged "Janet." Tagging may be performed in various ways in various embodiments. For example, "ASSIGN" button 308 may be selected and an input interface may open. The input interface may include a place to enter the text "Janet" or select "Janet" from a list of preexisting tags. In another example, the text "Janet" (in side bar 310) or a tag icon (not shown) representing the tag "Janet" may be dragged on top of object 306. In another example, object 306 may be dragged to side bar 310 on top of the text "Janet" or on top of a tag icon representing the tag "Janet."

In some embodiments, a sequence of interactions or an input device used differs from that described in this example. For example, instead of using a mouse as an input device, a touch sensitive display may be used.

Figure 4:
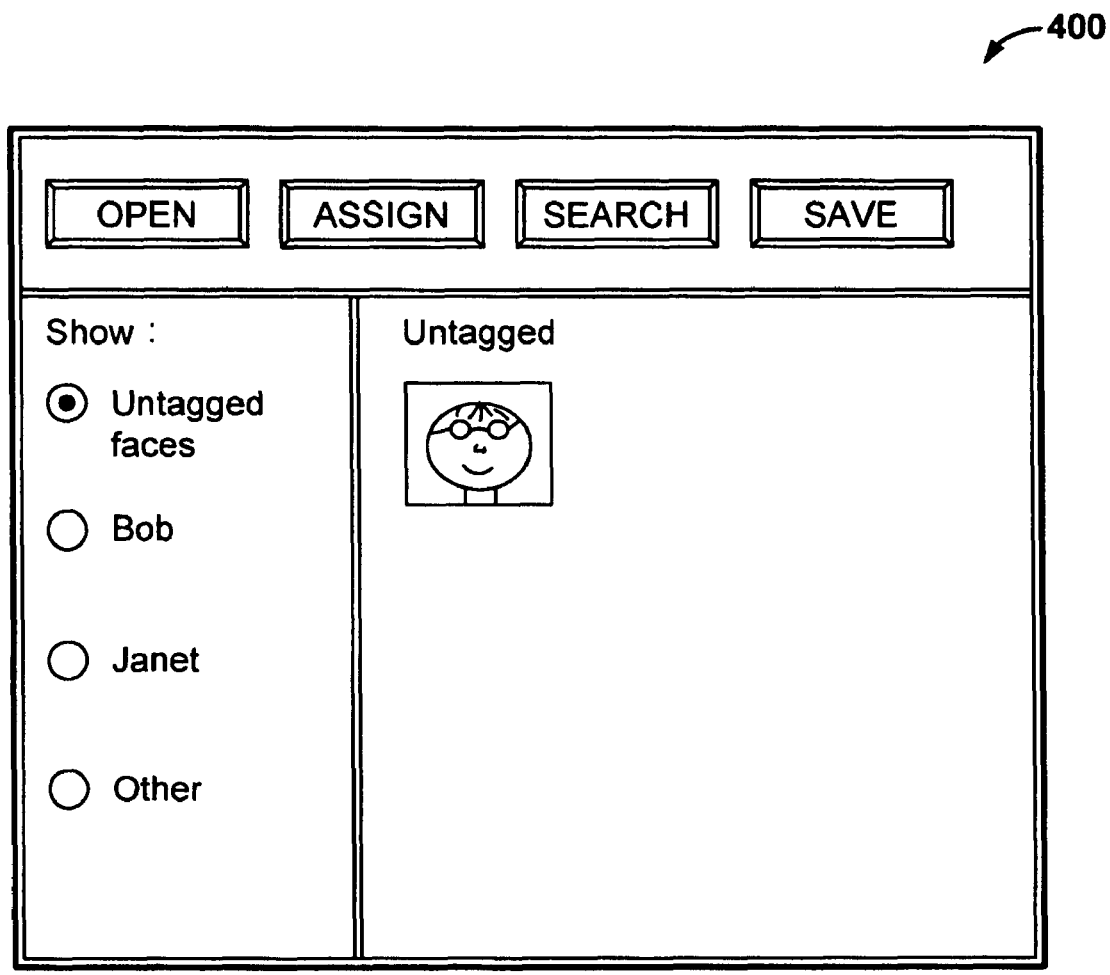
FIG. 4 is an embodiment of an interface for viewing objects, where the interface is responsive to tagging.

FIG. 4 is an embodiment of an interface for viewing objects, where the interface is responsive to tagging. In the example shown, interface 400 illustrates interface 300 after object 306 has been tagged "Janet." As shown, object 306 is no longer displayed. In some embodiments, after object 306 is removed from display, the objects may be rearranged. For example, the objects may be shifted in order to fill in a gap in the display due to the removal of an object. The objects may be reordered. In some embodiments, when a tag is removed or deleted from an object, the object is again displayed.

By removing an object from display once it has been tagged, space is made available for more objects to be displayed. For example, interface 400 may include 30 untagged faces, not all of which fit on the screen. As a user tags faces, more faces are removed, allowing the user to continue to tag faces without have to scroll through numerous faces that may already have been tagged. This may speed up the tagging process.

An object may have more than one tag. For example, a face may have the tag "Bob" and the tag "hat." In some embodiments, the object is only removed from display 400 once a tag that is associated with a name is assigned to the object. For example, if "hat" is assigned to the object, the object remains displayed. If "Bob" or another name tag is assigned to the object, the object is removed from display.

In some embodiments, interface 300 includes an option to show already tagged faces. For example, between the options "Untagged faces" and "Bob" in the left hand column of interface 300, a new option "Tagged faces" may be inserted. When this option is selected in combination with the "Untagged faces" option, all tagged and untagged faces are displayed. As faces are tagged, they remain displayed, but they move from the group of untagged faces to the group of tagged faces. When this option is deselected, only untagged faces are displayed and as faces are tagged, they are removed from display.

In some embodiments, an interface for tagging faces displays a set of faces. The interface includes a "Show already tagged faces" checkbox. If this checkbox is not checked, then only untagged faces are displayed. As faces are tagged, they are removed from display. If this checkbox is checked, then untagged and tagged faces are displayed. As faces are tagged, they remain displayed.

Interface 300 may include a way to indicate not to tag the object. For example, if the objects displayed are all meant to be faces, one of the objects may have been incorrectly determined to be a face. In another example, if the objects displayed include a set of faces from a crowd, the user may not want to tag those faces. The user may select an object and indicate not to tag the object or that the object is not a face. For example, a menu item such as "not a face" or "do not tag" may be selected. In some embodiments, upon receiving such an indication, the object is removed from the display.

Figure 5:
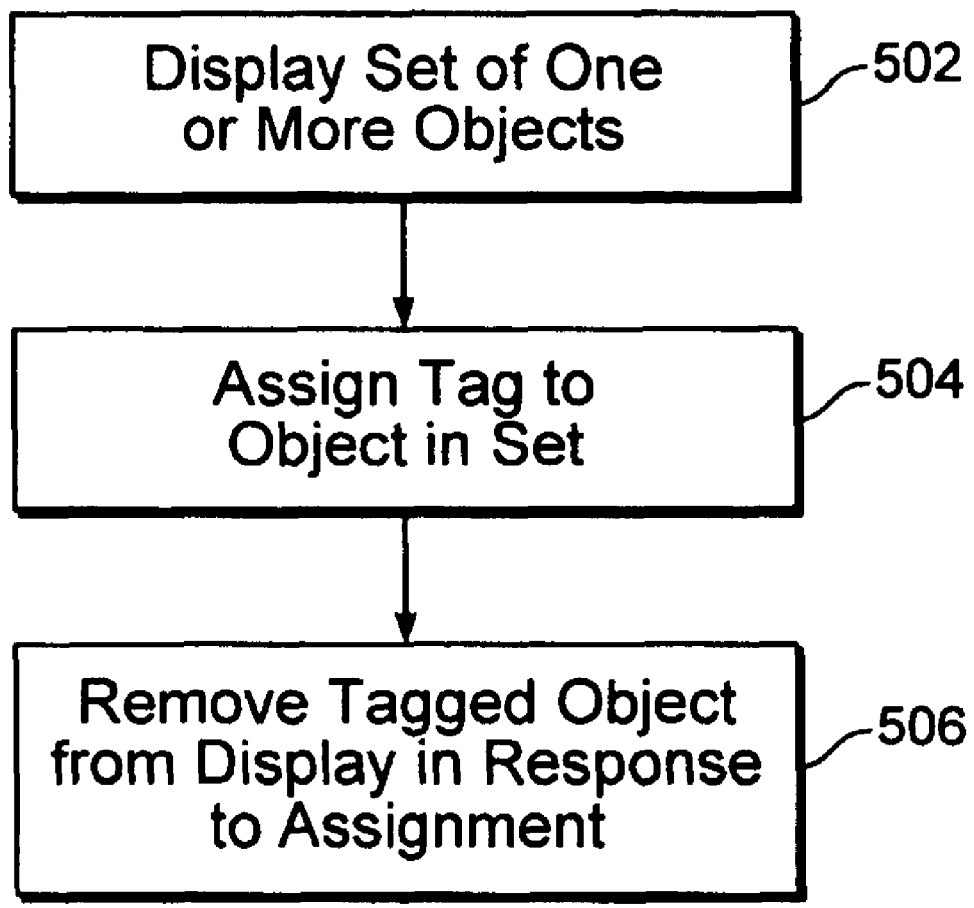
FIG. 5 is a flowchart illustrating an embodiment of displaying a set of objects, where the display is responsive to tagging.

FIG. 5 is a flowchart illustrating an embodiment of displaying a set of objects, where the display is responsive to tagging. In the example shown, a set of one or more objects is detected by a detection process. At 502, a set of one or more objects is displayed. For example, objects 304 and 306 are detected by a detection process and displayed as shown in interface 300. At 504, a tag is assigned to an object in the set. For example, the tag "Janet" is assigned to object 306 in interface 300. At 506, the tagged object is removed from the display in response to the assignment. For example, object 306 is removed from interface 300, as shown in interface 400. This may be performed by invoking a notification callback when a user tags a face with a tag, removing the object from a list of objects for display, and refreshing the screen.

In some embodiments, an interface includes a count of the number of objects (and/or images) with a particular tag. For example, a number in parentheses may indicate the number of objects to which a tag has been assigned. "Janet (3)" in interface 300 may indicate that three objects have the "Janet" tag. If object 306 is tagged "Janet," the object may be removed from display in interface 400 and "Janet (4)" may be displayed. In some embodiments, another notation besides a count in parentheses may be used.

Figure 6:
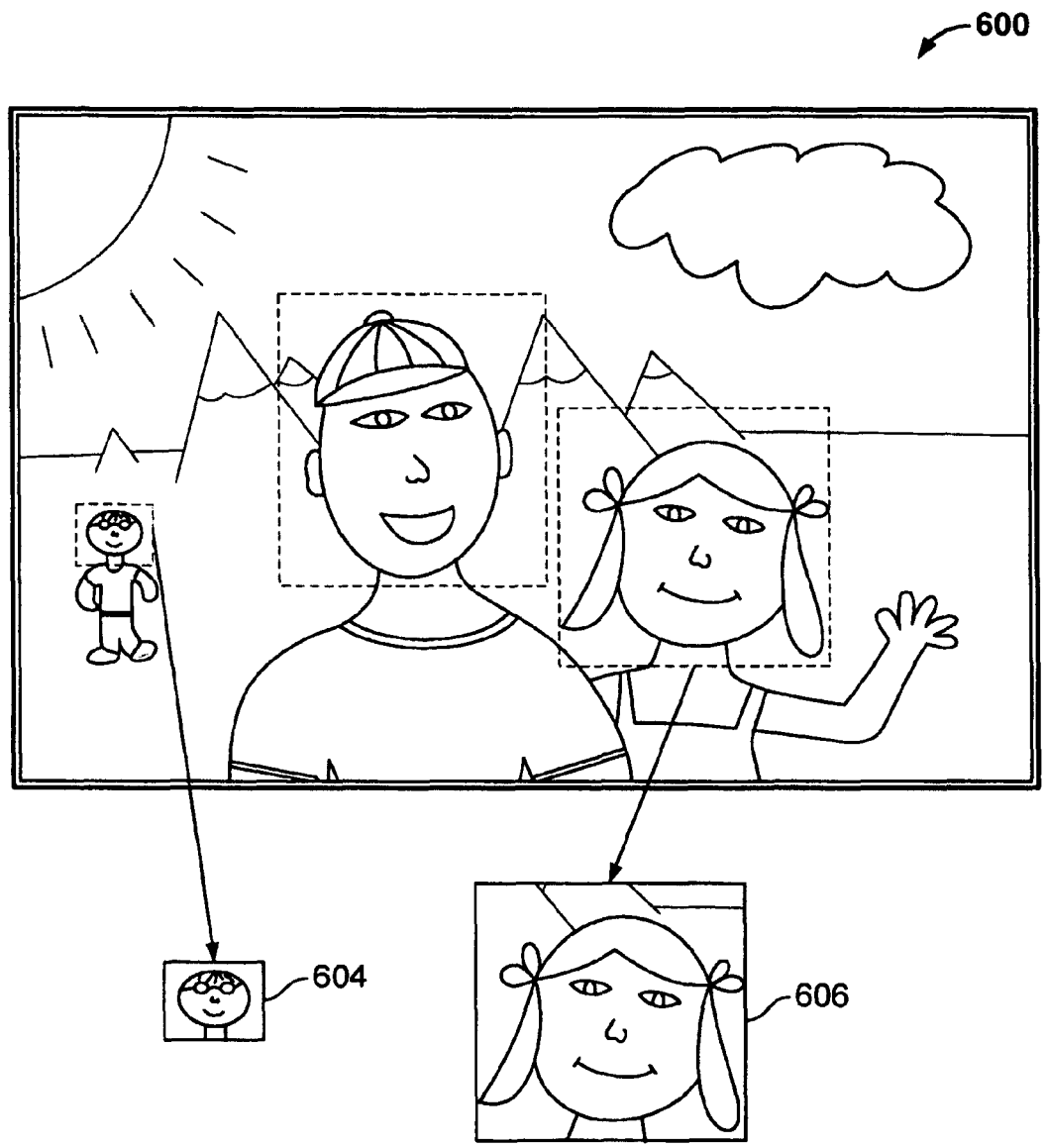
FIG. 6 is an embodiment of an image including objects that have differences associated with them.

FIG. 6 is an embodiment of an image including objects that have differences associated with them. In the example shown, image 600 may be a file in a variety of formats, including JPEG and GIF. In some embodiments, image 600 is generated using a digital camera. In some embodiments, image 600 shows image 100.

In this example, detection processing has detected occurrences of faces in objects 604 and 606. As a result of conditions at the time image 600 was captured, objects 604 and 606 may have some differences associated with them. For example, since the man in object 604 is further away, object 604 is smaller than object 606. As a result of lighting conditions and/or the camera's focus settings, object 604 may be dark and/or blurry. Object 606 may include a detection object (e.g., a girl's face) that is oriented at an angle.

In some embodiments, object 604 and object 606 are normalized before being displayed in an interface such as interface 200. Normalizing may include performing an adjustment, including an edit, to the object. Using faces as an example, the size of the face, orientation of the face, location of the face within the box, coloring, lighting, sharpness, red eye, or any other parameter may be adjusted. In some embodiments, normalizing includes setting all objects to a standard size and/or orientation. For example, large faces are scaled down and small faces are scaled up. The size of object 604 may be increased and/or the size of object 606 may be decreased to display objects 604 and 606 as the same size, even though their actual dimensions in the context of image 600 may be different. In some embodiments, the aspect ratio of an object is maintained to avoid distortion. In some embodiments, objects may have different aspect ratios but they are displayed using a common aspect ratio. This may occur if some objects are manually detected while other objects are automatically detected, or if multiple automatic detection processes are used. Normalization may include compressing an object to a smaller storage size. By displaying normalized faces in an interface, it may be easier to locate and identify faces, which makes tagging and search faster and easier.

Normalizing may include correcting one or more problems with the object, such as color cast, too dark/too light, too blurry, red eye correction, normalizing the face expression, removing glasses, clearing the background, etc. In some embodiments, normalizing includes running an automatic correction process on the object to correct problems.

Normalizing may include any adjustment to the object, including adjusting a facial expression, removing the background, removing accessories such as glasses, opening eyes, etc.

In some embodiments, an interface includes a way for the user to specify whether to display the objects in their native size or to display objects after being normalized. For example, a checkbox may be provided to toggle between these options. Normalization parameters, including which adjustments to perform, may be automatically configured or user configured. For example, an interface may be provided for allowing a user to specify normalization parameters.

In some embodiments, information from detection processing performed on the object may be used in normalization processing. For example, color cast correction may be done better when it is determined that the object is a face, as opposed to any general image.

Figure 7:
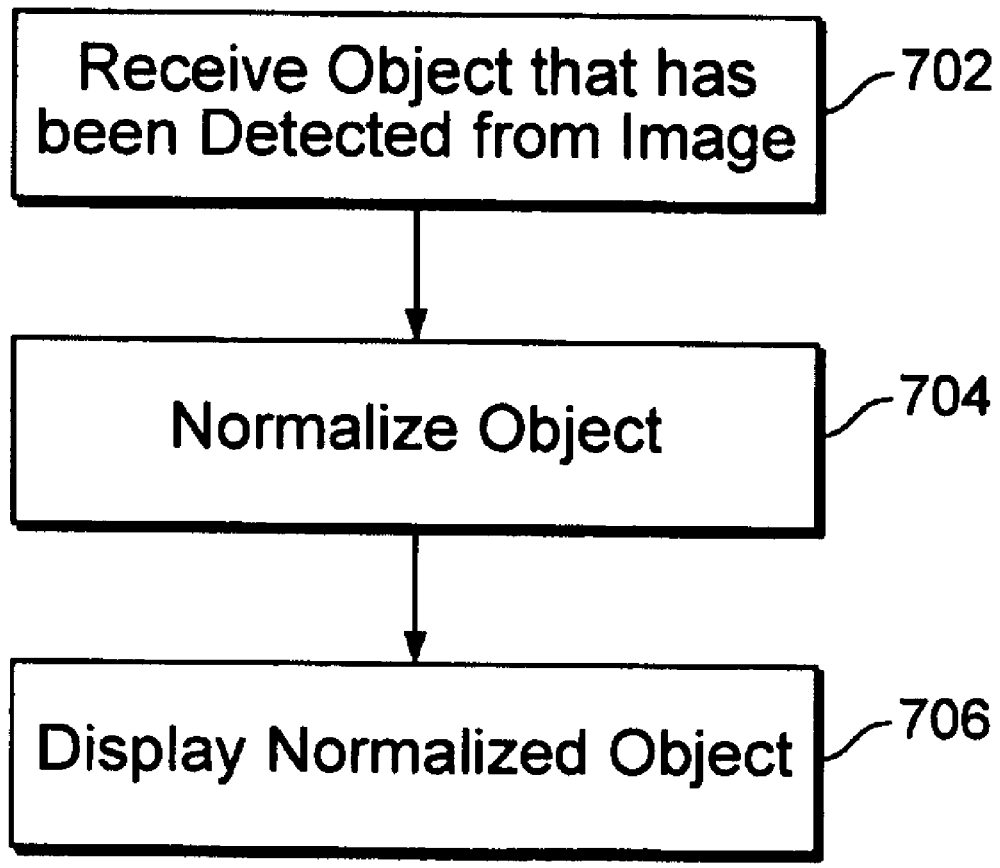
FIG. 7 is a flowchart illustrating an embodiment of displaying an object that has been normalized.

FIG. 7 is a flowchart illustrating an embodiment of displaying an object that has been normalized. In the example shown, an object that has been detected from an image is received at 702. For example, object 604 or object 606 is received. At 704, the object is normalized. For example, object 604 is scaled up in size, lightened, and sharpened. Predetermined parameters may be used to normalize an object. For example, a predefined size (defined by a display height and display width) or predefined lighting parameters may be used. The detection object in object 606 is rotated so that it is oriented at 0 degrees. At 706, the normalized object is displayed. For example, object 604 is displayed as object 204 in interface 200. Object 606 is displayed as object 208 in interface 200. As shown, objects 204 and 208 are displayed as the same size. A tag may then be assigned to the object. Object 204 is a normalized version of object 604 and represents object 604 in a display. Normalized object 204 does not need to be saved as a separate object, though data may be stored so that a normalization process does not need to be run on object 604 each time object 604 is displayed.

To perform normalization of an object, information associated with the object is obtained. For example, information from Table 1 may be obtained. Based on the coordinates, height, width, and angle, a subimage (e.g., the face rectangle) is extracted. For example, the subimage is resampled to obtain a cropped image of predefined fixed dimensions. Bilinear sampling, bicubic sampling, or nearest-neighbor sampling may be used. Lighting can be normalized using histogram equalization. Alternatively, the object detection process may have computed the standard deviation of pixel intensities. The pixel intensities may be divided by their standard deviation to perform a lighting correction. Any appropriate technique may be used to normalize the image.

Figure 8A:
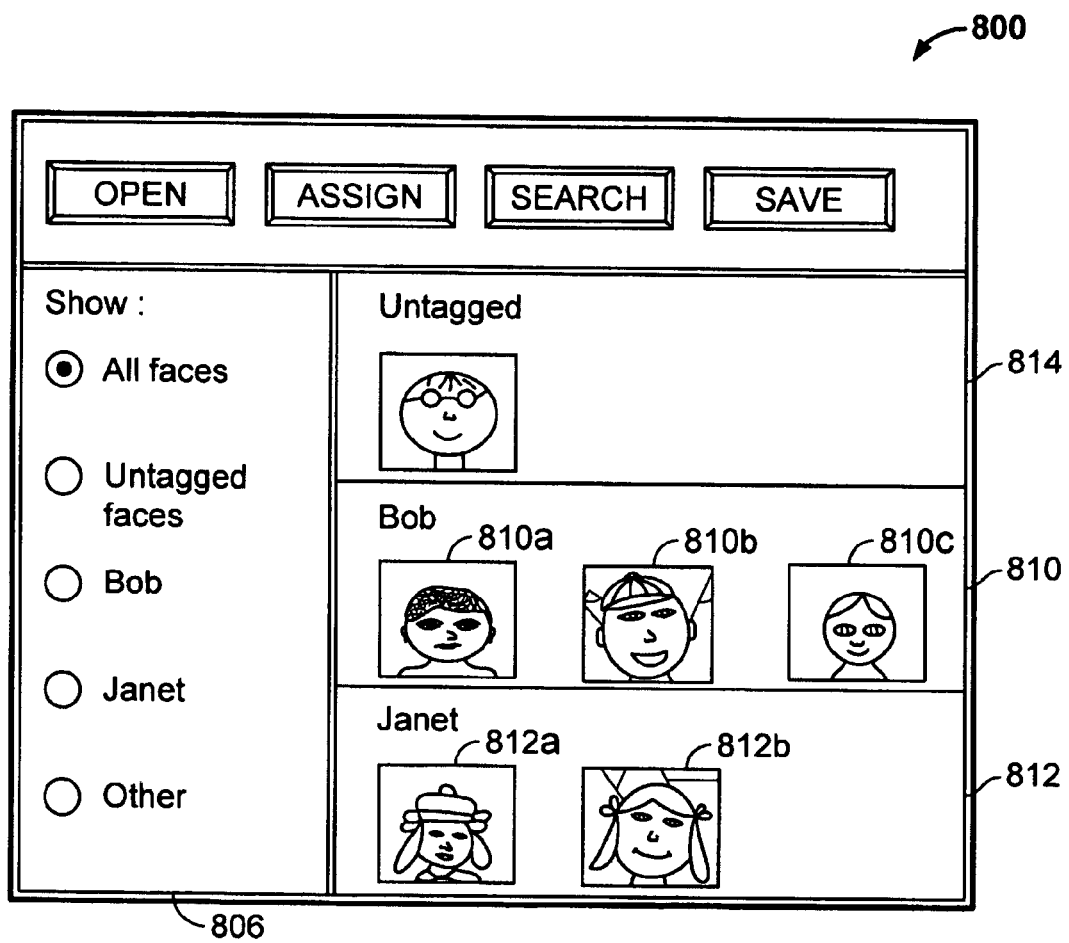
FIG. 8A is an embodiment of an interface for viewing objects in a manner that conveys grouping.

FIG. 8A is an embodiment of an interface for viewing objects in a manner that conveys grouping. In the example shown, interface 800 displays objects resulting from face detection performed on images. Some of the objects in this example are tagged while other objects are untagged. In some embodiments, interface 800 shows interface 200 when an "all faces" option is selected.

In interface 800, objects are shown based on criterion specified in side bar 806. Side bar 806 includes options to show all faces, untagged faces, faces tagged "Bob," faces tagged "Janet," and other options. For example, other options may include options to show objects that are not faces (i.e., objects that are detected using a detection object that is not a face) or objects that a user has identified as not having a face. Any option(s) may be selected.

In interface 800, objects are arranged to convey to which group an object belongs. Objects may be grouped by tag or any other property or data, such as by collection. In this example, the objects are grouped by tag. As shown, each row includes objects having the same tag. Row 810 includes objects with tag "Bob." Row 812 includes objects with tag "Janet." Row 814 shows objects that are untagged. If the tag on an object changes, the display may be updated immediately. The object may be moved from one group to another as the tag changes.

If a row has more objects than screen space to display all the objects in that row, a scroll bar or arrow button may be provided to scroll to view more faces. Alternatively, the objects may be displayed using smaller sizes, or multiple rows may be used to display objects associated with the same tag. The objects may be normalized.

All the objects in a group are not necessarily displayed. In some embodiments, the objects in a group are displayed in a collapsed display state, such that a subset of the objects in the group is displayed. For example, one object may be displayed to represent one or more objects in the group. All the objects in the group may be collapsed to one object or a tag icon. One or more objects may be designated as part of a stack. For example, a stack may include similar objects. The stack may be displayed as one object representing the stack.

Within each row, objects may be arranged in any appropriate order. For example, the objects may be arranged in random order, based on date (which may include time), number of tags, probability or certainty that the object should have the tag, etc. The date may be the date the object was detected, the date the object was tagged, the date of the image from which the object was detected, or any other date. In the case of probability that the object should have the tag, a facial identification process may have been run on a set of faces, and the faces tagged with names. A probability that the name belongs to the face may be provided. The probability may be used to order the objects within a row. For example, the faces that are most likely to belong to Bob may be displayed first. User tagged faces (which have a probability of 1) may be displayed first in the row, followed by automatically tagged faces, in order of decreasing probability. A user may be able to adjust the ordering of objects within a row, for example by selecting and moving objects.

The rows themselves may be arranged in any appropriate order. For example, the rows may be arranged alphabetically, in random order, or based on any parameter associated with the group, such as the number of objects, number of tags, family, frequency of co-occurrence with a detection object, etc. For example, if Bob is most frequently in the same image as Janet, the row of objects tagged "Bob" may be positioned next to the row of objects tagged "Janet". In some embodiments, a user is able to adjust the ordering of rows. For example, a user may be able to select Untagged row 814 and place it below Janet row 812. An appropriate input sequence, such as using a mouse to "drag and drop" a row, may be used.

In some embodiments, in a similar manner to objects, images may be arranged to convey to which group they belong. For example, images sharing the same tag may be displayed in the same row.

In some embodiments, an object may have more than one tag associated with it and the object may be displayed multiple times. For example, object 812b may be tagged with "Janet" and "Yosemite." If display 800 includes objects with the tag "Yosemite," object 812b may be displayed twice: once in the row for the tag "Janet" and once in the row for the tag "Yosemite."

The objects may be arranged in other ways to convey to which group they belong. For example, the objects may be arranged hierarchically, such as in a tree structure with multiple levels of branches.

Figure 8B:
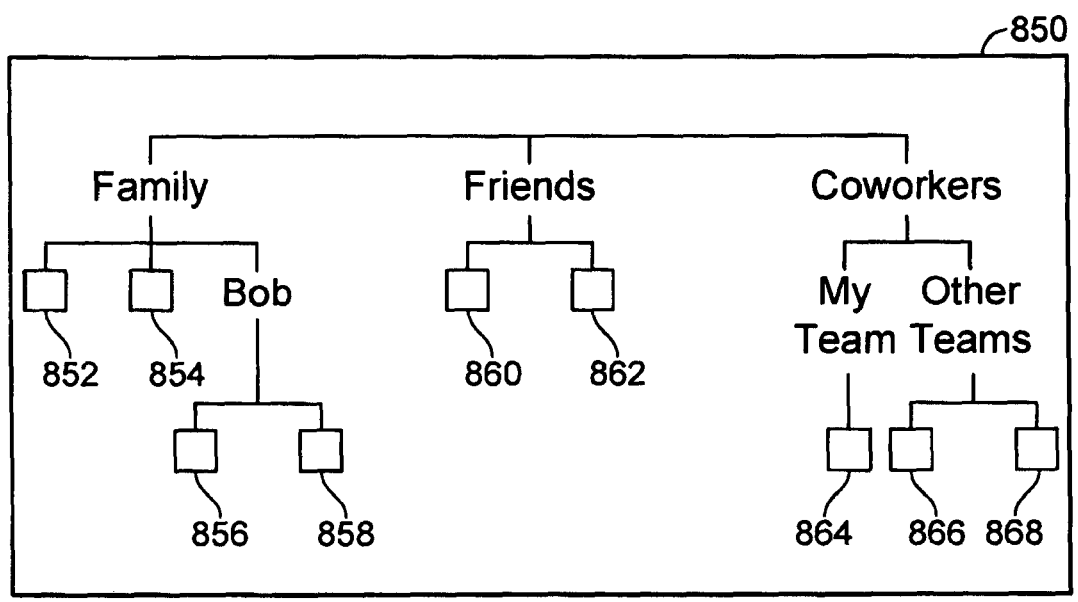
FIG. 8B is an example of a hierarchical interface for viewing objects.

FIG. 8B is an example of a hierarchical interface for viewing objects. In this example, objects 852-868 are arranged in a tree structure to convey grouping. A tree structure may include branches such as "friends," "family," and "coworkers." Below "family," objects 852-858 tagged "family" may be displayed. Below "family," objects 856 and 858 tagged "Bob" may be displayed. Below "coworkers," there may be branches for "my team" and "other teams." Below "my team," object 864 tagged "my team" is displayed. Below "other teams," objects 866 and 868 tagged "other teams" are displayed.

In some embodiments, the tree structure is obtained based on tag categories and subcategories. In some embodiments, the tree structure may be specified and adjusted using interface 850. For example, interface 850 may initially display all tags in the top directory. A user may select the "Bob" tag and specify that is located under family; an input device such as a mouse may be used. Interface 850 may be refreshed so that the tag "Bob" is below "family" and the objects with a tag of "Bob" are below "Bob." Other modifications such as creating a new branch (e.g., "Favorite Celebrities") or deleting an existing branch may be performed.

In some embodiments, an object's tag may be changed using interface 850. For example, if object 858 is moved from "Bob" to "friends," the "Bob" tag assigned to object 858 may be removed, and a "friends" tag may be added.

Figure 9:
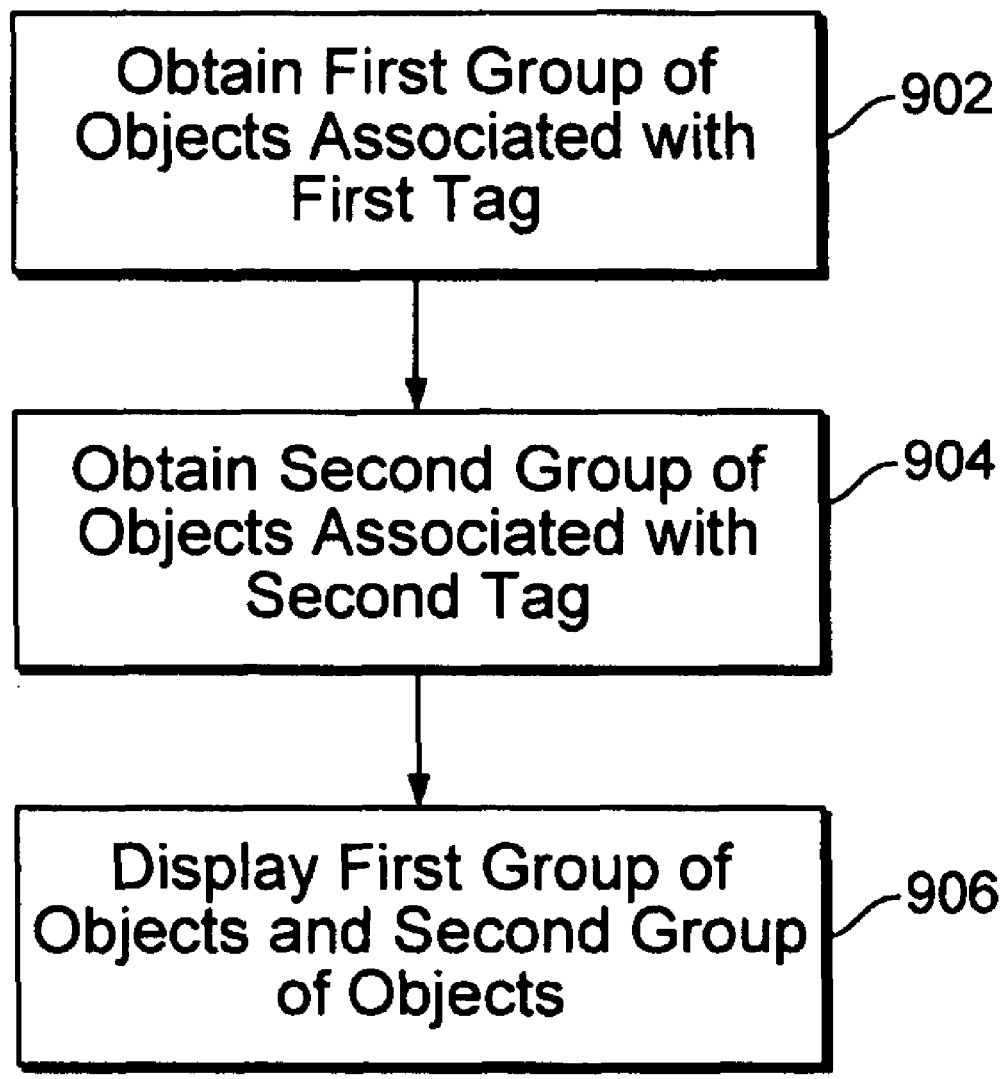
FIG. 9 is a flowchart illustrating an embodiment of displaying a set of objects to convey a grouping.

FIG. 9 is a flowchart illustrating an embodiment of displaying a set of objects to convey a grouping. In the example shown, a set of one or more objects is detected by a detection process. At 902, a first group of objects associated with a first tag is obtained. For example, objects 810*a*-810*c* are obtained. At 904, a second group of objects associated with a second tag is obtained. For example, objects 812*a* and 812*b* are obtained. At 906, the first set of objects and the second set of objects are displayed. The objects are arranged to convey to which group they belong. For example, objects 810*a*-810*c* are displayed in row 810 and objects 821*a* and 812*b* are displayed in row 812. Alternatively, the objects may be displayed in different regions.

Arranging objects may be implemented in various ways in various embodiments. For example, in the case of faces, all faces may be maintained in a balanced tree, sorted by their tag. New faces (faces with no tags) are added at the end of the tree. When the user changes the tag of a face, it gets reordered in the tree. The current state of the tree is presented on the screen and separators may be added between faces of different tags. In some embodiments, separated tags start on a new line.

Arranging objects to convey to which group they belong may facilitate error correction and search. For example, it may be faster and easier to identify and correct mistagged faces and to search for a good shot of someone.

Figure 10:
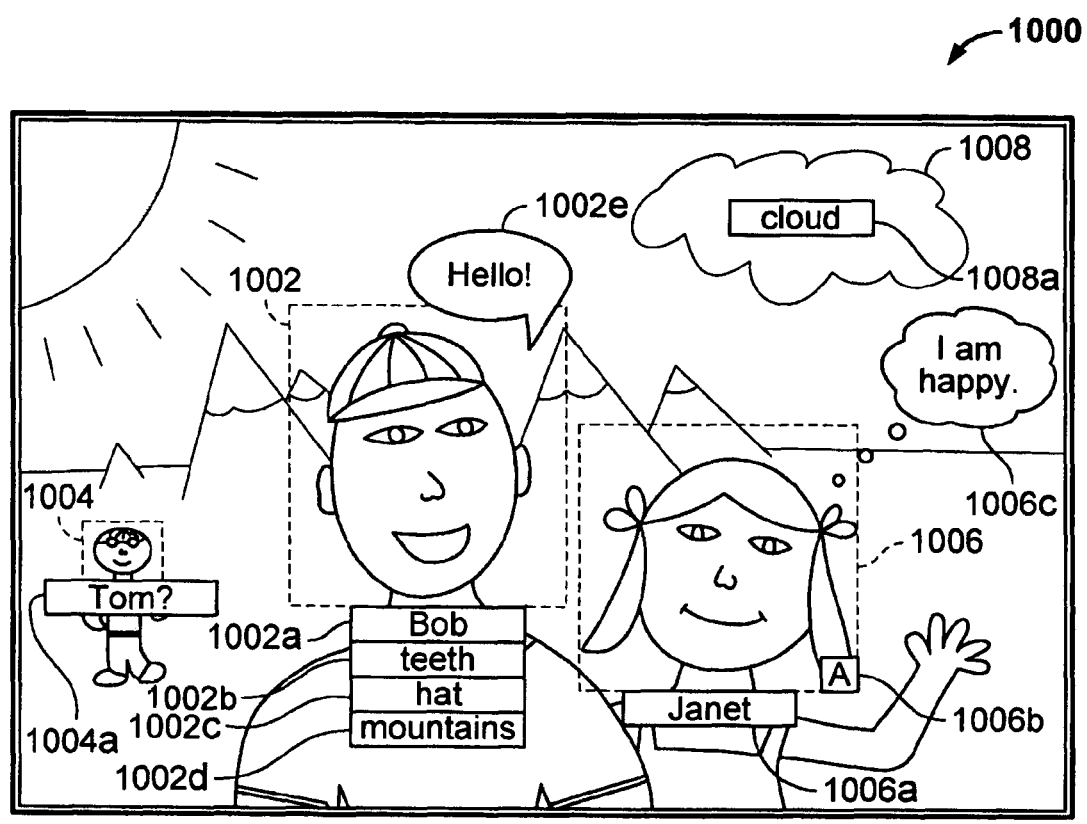
FIG. 10 is an embodiment of an image including objects and tag indicators.

FIG. 10 is an embodiment of an image including objects and tag indicators. In the example shown, image 1000 may be a file in a variety of formats, including JPEG, GIF, and BMP. In some embodiments, image 1000 is generated using a digital camera or digital video recorder. Examples of video formats include Audio Video Interleave (AVI), Windows Media Video (WMV), Moving Picture Experts Group (MPEG), RealMedia (RM), or Shockwave Flash (SWF). In some embodiments, image 1000 shows image 100 with tags indicated.

In this example, detection processing has detected occurrences of detection objects in objects 1002, 1004, 1006, and 1008. Object 1002 has been tagged with tags as indicated by tag indicators 1002*a*-1002*e*. Object 1006 has been tagged as indicated by tag indicators 1006*a*-1006*c*. Object 1004 has been tagged as indicated by tag indicator 1004*a*. Object 1008 has been tagged as indicated by tag indicator 1008*a*. In some embodiments, image 1000 may also be tagged and this may be indicated.

Tags may include any type of data, including text, images, audio or video. Tag data may include a name, thought, date, facial expression, age, gender, etc. Tags may be automatically or user assigned. For example, a tag comprising an audio clip of Janet may be automatically assigned to a face belonging to Janet.

In some embodiments, image 1000 is displayed with tags indicated as shown. Tags may be indicated in any appropriate location. Tags may be indicated using graphics. Tag indicators may be displayed in proximity to the object in the image or at a location based at least in part on the location of the object. For example, tag indicators may be displayed beneath a box outlining an object, such as tag indicators 1002*a*-1002*d*, 1004*a*, and 1006*a*. Name tags may be displayed above or below each face. Tag indicators may be displayed over the object, such as tag indicator 1008*a*. Any number of tags may be indicated for each object.

Tags may be indicated using other graphics, such as tag indicators 1002*e* and 1006*c*. Tag indicator 1002*e* displays tag data in a speech balloon. Tag indicator 1006*c* displays tag data in a thought balloon. A speech balloon, such as tag indictor 1002*e*, allows tag data to be understood as representing the speech or thoughts of a given character in the image. Tags may be indicated using captions. Tags may be indicated using tag icons.

In some embodiments, the format of a tag indicator indicates information about the tag. Format includes appearance. For example, a tag may be designated as a particular type of tag, such as a name, speech, thought, mood, description, background, etc. Different types of tags may be indicated in different ways. For example, name tags may be indicated using boxes and speech tags may be indicated using speech balloons. Speech tags may be indicated by playing audio data. Different types of tags may be displayed using different fonts, font sizes, colors, or text. The way a type of tag is indicated may be user configurable, e.g., in a settings interface.

A tag type may include any data associated with the tag, such as whether a tag is automatically or user assigned, and if automatically assigned, whether the tag has been confirmed by the user. For example, object 1004 may have been automatically identified as "Tom" and automatically tagged "Tom." Tag indicator 1004*a* may display "Tom?" (i.e., "Tom" followed by a question mark) in order to indicate that object 1004 was automatically identified as "Tom" but the identification has not been confirmed by the user.

In some embodiments, the user controls or is able to adjust placement of the tag indicator. For example, the user may drag the indicator to a desired location using a mouse or other pointing device.

A tag may be indicated by an icon, such as tag indicator 1006*b*, where a box with an "A" (indicating audio) is displayed. Clicking on tag indicator 1006*b* may play audio data (e.g., "Janet," "I am happy," or "I am really hungry. I am really looking forward to trying that new restaurant tonight with my friends") or video data. A speech balloon may be voiced differently from a thought balloon. The audio file may be useful when tag data is long or for video tags.

Tags may be indicated in a video. For example, an object can be detected and tracked in a video. Tracking may include extracting the movement of the object over time and adjusting the position of the tag indicator based on the location of the object. A tag indicator may be placed at a first location associated with a first frame of the video. The tag indicator may be placed at a second location associated with a second frame of the video. Speech recognition may be used to convert audio data to text. Voice recognition may be used to match a face with a voice. A face in the video may be automatically (or manually) tagged with the text. The tag may be indicated in a speech bubble that follows the face in the video.

Tag indicators may be displayed in full or selectively. For example, if the cursor hovers over a face or if the user double clicks on a face, the name of a person may appear as a tooltip or an audio file may play. In some embodiments, when tag data is long, only a portion of the tag data is displayed (e.g., the first two words up to 10 characters), and the rest of the tag data is displayed when the user clicks on an arrow or a "more" button.

Figure 11:
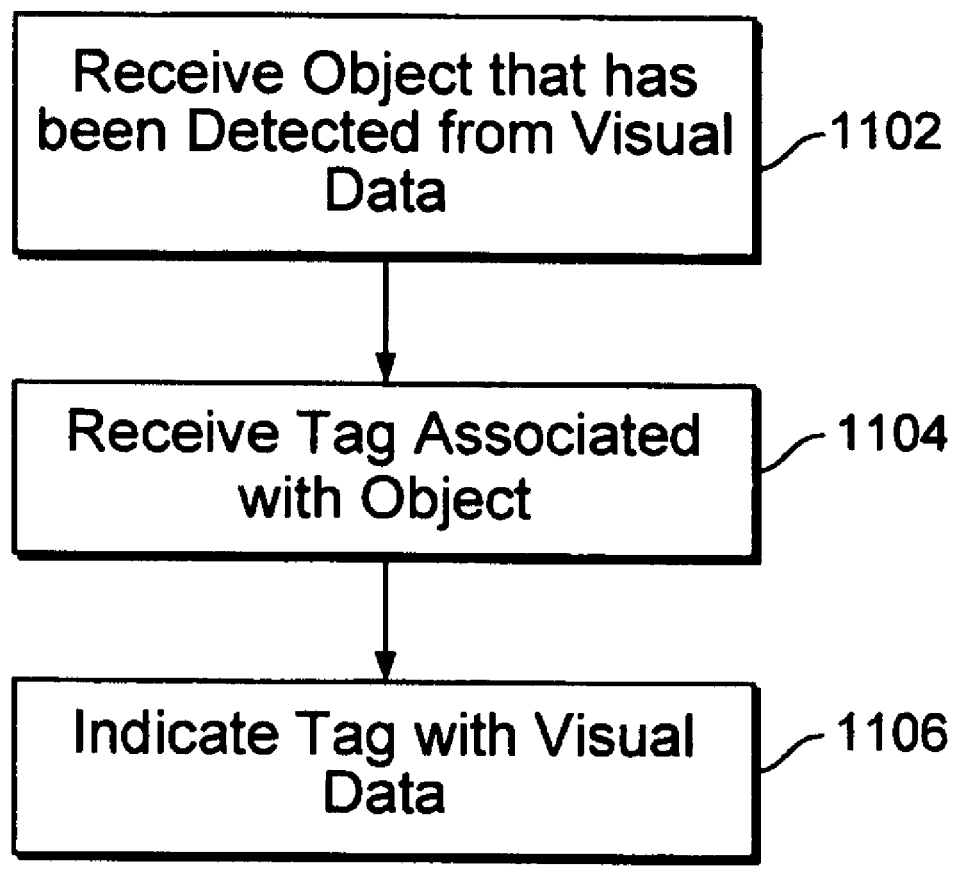
FIG. 11 is a flowchart illustrating an embodiment of indicating a tag.

FIG. 11 is a flowchart illustrating an embodiment of indicating a tag. At 1102, an object that has been detected from visual data is received. For example, object 1002 is received. The visual data may include an image or video. At 1104, a tag associated with the object is received. For example, tags "Bob" and "Hello!" are received. At 1106, the tag is indicated with the visual data. For example, tag indicators 1002*a* and 1002*e* are displayed.

In some embodiments, at 1106, the tag indicator is intelligently placed. For example, tag indicators may be placed so that they do not cover other tag indicators, other objects, or a subset of objects (e.g., objects that have been tagged). In some embodiments, tag indicators are shown selectively or scaled down in size or font size in order to avoid covering other tags or objects. In some embodiments, tag indicators may be toggled on and off.

Figure 12:
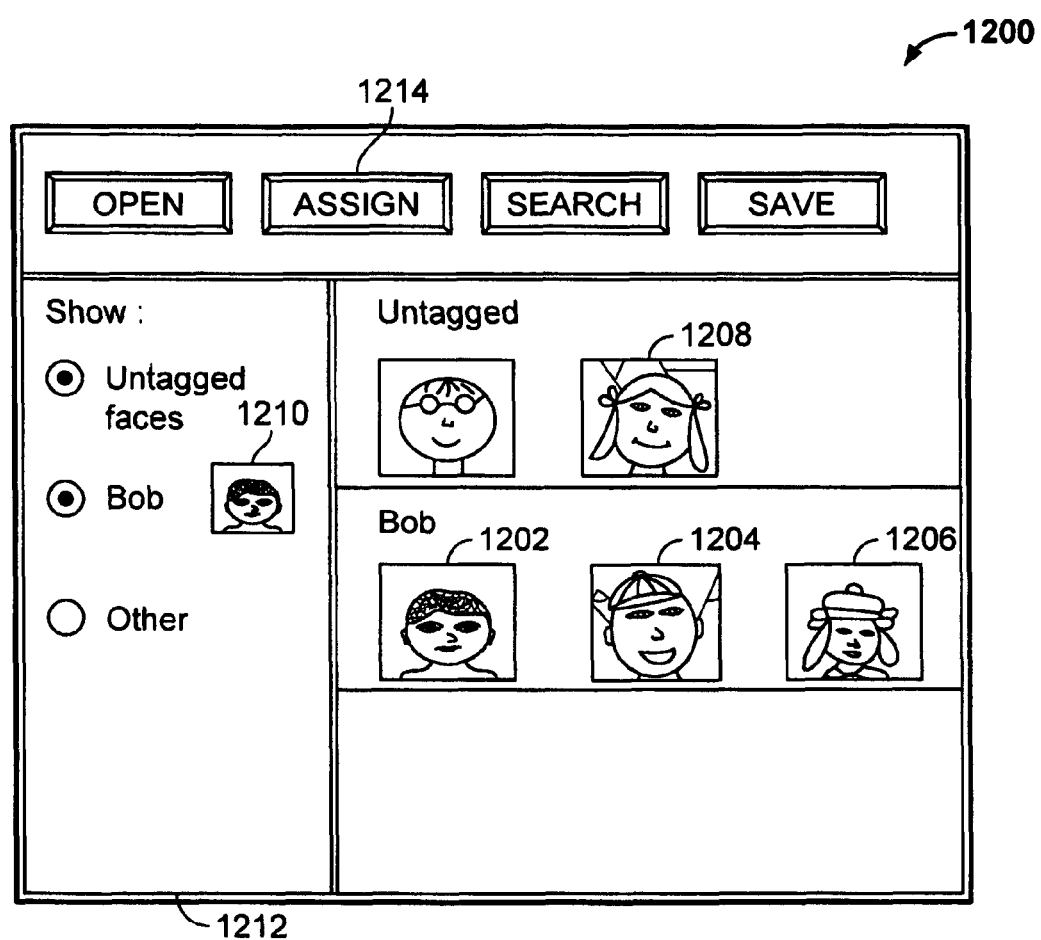
FIG. 12 is an embodiment of an interface for viewing objects with a tag icon displayed.

FIG. 12 is an embodiment of an interface for viewing objects with a tag icon displayed. In the example shown, interface 1200 displays objects resulting from face detection performed on images. Some of the objects in this example are tagged while other objects are untagged. Interface 1200 may be used to tag faces or other objects. In some embodiments, interface 1200 shows interface 200 with tag icons displayed.

In interface 1200, objects are shown based on criterion specified in side bar 1212. Side bar 1212 includes options to show untagged faces, faces tagged "Bob," and other options. Side bar 1212 includes tag icon 1210 corresponding to tag "Bob." A tag icon, as used herein, includes a graphical representation of a tag. For example, the tag icon may help make a tag identifiable to the user. In some embodiments, a tag icon for a particular tag may be selected from one of the objects that have that tag.

A tag may be created by selecting an object or image and selecting "ASSIGN" button 1214. For example, object 1208 may be selected and "ASSIGN" button 1214 selected, and an input interface may open. The input interface may include a place to enter the text "Janet." The tag "Janet" is created and assigned to object 1208. In some embodiments, when the tag is created, the first object assigned the new tag becomes the tag icon. For example, object 1208 may be automatically set as the tag icon. In some embodiments, a window displaying objects and/or images opens and the user may select one of the objects or images as the tag icon. The window may include other objects from the same image. The window may include other objects associated with the same tag. The object may be shown as selected by default. For example, if object 1208 is from image 200, the other objects in image 200 may be displayed. Object 1208 may be shown as selected by default.

A tag may be created without assigning the tag to an object. For example, side bar 1212 may provide a way to create a new tag. A tag may be created by selecting a "create new tag" option (not shown). Clicking the right mouse button in side bar 1212 may open a menu with a "create new tag" option. In some embodiments, when the tag is created, it initially has a blank tag icon. In some embodiments, a window displaying objects and/or images opens and the user may select one of the objects or images as the tag icon. The first object or image to be assigned a given tag may be designated as the tag icon.

In some embodiments, a normalized version of the object may be designated as the tag icon.

Figure 13:
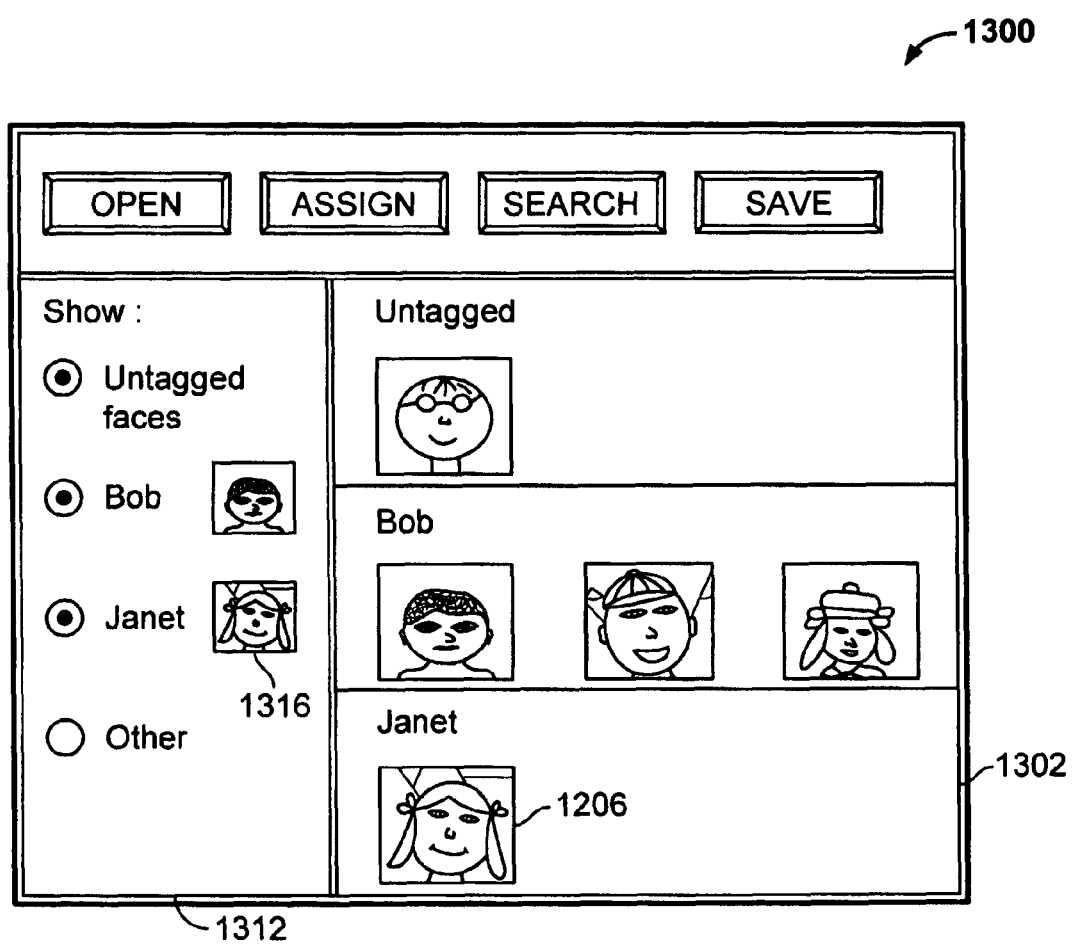
FIG. 13 is an embodiment of an interface in which the first object assigned a given tag is selected as the tag icon.

FIG. 13 is an embodiment of an interface for viewing objects in which the first object assigned a given tag is selected as the tag icon. In the example shown, interface 1300 illustrates interface 1200 after object 1206 has been tagged "Janet." As shown, object 1206 is displayed in row 1302, associated with tag "Janet." In side bar 1312, tag icon 1316 is displayed next to the selection "Janet." As shown, tag icon 1316 is set to object 1206. In some embodiments, tag icon 1316 remains the same unless the user edits tag icon 1316. For example, other objects may be subsequently tagged "Janet," but tag icon 1316 would remain set to object 1206.

In some embodiments, side bar 1312 displays a hierarchical menu of tags. A tag icon may be displayed for each tag. For example, next to each tag, an associated tag icon is displayed.

A tag icon may be used in various ways in various embodiments. For example, the tag icon may be displayed next to each tag in a list or menu of tags. The tag icon may be used as a thumbnail. The tag icon may be used to indicate a tag. For example, in image 1000, tag indicator 1006*b* may include a tag icon (e.g., tag icon 1316) instead of "A." The tag icon may be scaled as appropriate for various uses. In the examples of side bar 1312 and indicator 1006*b*, the tag icon may be scaled down. The tag icon may be used to represent a collapsed set of objects, where a subset of the objects in the set is displayed. The tag icon may be used to represent a stack of objects, where a stack may include similar objects, which may be manually and/or automatically designated.

In some embodiments, the user may change the tag icon. For example, the user may double click on the tag icon and a window may open showing all objects, or all objects from images with which the tag is associated. The user may select one of the objects to be the tag icon. In another example, the user may change the tag icon by dragging another object on top of the existing tag icon. For example, another object (not shown) in row 1302 may be dragged on top of tag icon 1316 to change the tag icon to that object.

Figure 14:
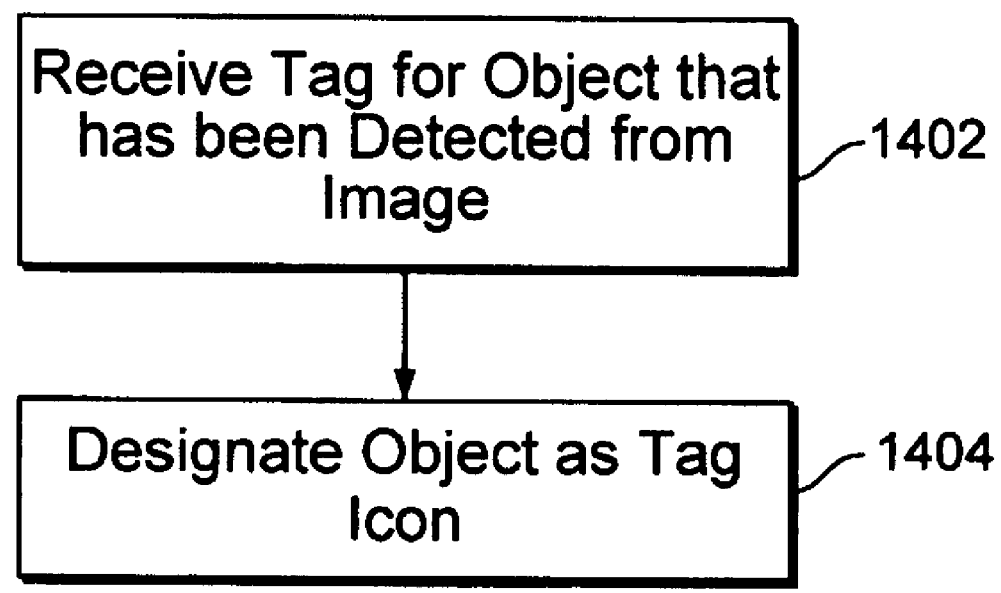
FIG. 14 is a flowchart illustrating an embodiment of designating a tag icon.

FIG. 14 is a flowchart illustrating an embodiment of displaying a set of objects. At 1402, a tag for an object that has been detected from an image is received. For example, a tag with tag data "Janet" is received for object 1208. At 1404, the object is designated as a tag icon. For example, object 1208 is designated as the tag icon. For example, a stored attribute of a tag may include the tag icon. The tag icon may be stored in various ways in various embodiments. For example, the tag icon may be stored by referencing the source image and location of a subimage (e.g., coordinates, length and width). The tag icon may be stored as a separate file or as a reference to an object, as shown in the last column of Table 2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
    displaying a set of one or more objects, wherein each object is displayed separately from an image from which the object has been detected and displaying is performed by a processor;
    receiving a tag to be assigned to an object in the set;
    assigning a tag to the object in response to receiving the tag;
    removing the tagged object from a display window in response to receiving the tag;
    receiving an untag indication to untag the tagged object; and
    redisplaying the object in response to receiving the untag indication.

2. A method as recited in claim 1, wherein the object has been automatically detected from the image.

3. A method as recited in claim 1, wherein the object is associated with one or more of the following: at least a portion of the image from which the object was detected, with a location in the image from which the object was detected, or a probability that the object includes a detection object.

4. A method as recited in claim 1, wherein the set of one or more objects are detected from a plurality of images and/or the set of one or more objects is detected by a user.

5. A method as recited in claim 1, wherein the object includes a face.

6. A method as recited in claim 1, wherein the tag includes one or more of the following: tag data that is user specified, a name, or a name resulting from an object identification process.

7. A method as recited in claim 1, wherein the indication is automatically generated.

8. A method as recited in claim 1, wherein the indication is initiated by a user.

9. A method as recited in claim 1, further including rearranging one or more remaining objects in the display window, including by shifting one or more remaining objects to fill in a gap created by removing the tagged object from the display window.

10. A method as recited in claim 1, further including receiving an indication not to tag a second object, and removing the second object from the display window.

11. A method as recited in claim 1 wherein removing is performed in the event an option to show untagged faces is inactive.

12. A system including:
a processor; and
a non-transitory memory coupled with the processor, wherein the memory is configured to provide the processor with instructions which when executed cause the processor to:
display a set of one or more objects, wherein each object is displayed separately from an image from which the object has been detected;
receive a tag to be assigned to an object in the set; assign a tag to the object in response to receiving the tag;
remove the tagged object from a display window in response to receiving the tag;
receive an untag indication to untag the tagged object; and
redisplay the object in response to receiving the untag indication.

13. A system as recited in claim 12, wherein the object has been automatically detected from the image.

14. A computer program product, the computer program product being embodied in a non-transitory computer readable storage medium and comprising computer instructions for:
displaying a set of one or more objects, wherein each object is displayed separately from an image from which the object has been detected;
receiving a tag to be assigned to an object in the set;
assigning a tag to the object in response to receiving the tag;
removing the tagged object from a display window in response to receiving the tag;
receiving an untag indication to untag the tagged object; and
redisplaying the object in response to receiving the untag indication.

15. A computer program product as recited in claim 14, wherein the object has been automatically detected from the image.

16. A system as recited in claim 12, wherein the memory is configured to provide the processor with further instructions to rearrange one or more remaining objects in the display window, including by shifting one or more remaining objects to fill in a gap created by removing the tagged object from the display window.

17. A computer program product as recited in claim 14, further including computer instructions for rearranging one or more remaining objects in the display window, including by shifting one or more remaining objects to fill in a gap created by removing the tagged object from the display window.

18. A system as recited in claim 12, wherein the memory is configured to provide the processor with further instructions to receive an indication not to tag a second object, and remove the second object from the display window.

19. A computer program product as recited in claim 14, further including computer instructions for receiving an indication not to tag a second object, and removing the second object from the display window.

20. A method as recited in claim 1, wherein:
there are a plurality of tag values and the display window is associated with objects that are untagged; and
the method further includes:
receiving a display setting indicating that objects which are assigned a first tag value are to be displayed; and
in the event the tag assigned to the object is the first tag value, displaying, in response to receiving the indication to tag the object, the tagged object in a second display window associated with objects that are assigned the first tag value.

21. A system as recited in claim 12, wherein:
there are a plurality of tag values and the display window is associated with objects that are untagged; and
the memory is configured to provide the processor with further instructions to:
receive a display setting indicating that objects which are assigned a first tag value are to be displayed; and
in the event the tag assigned to the object is the first tag value, display, in response to receiving the indication to tag the object, the tagged object in a second display window associated with objects that are assigned the first tag value.

22. A computer program product as recited in claim 14, wherein:
there are a plurality of tag values and the display window is associated with objects that are untagged; and
the computer program product further includes computer instructions for:
receiving a display setting indicating that objects which are assigned a first tag value are to be displayed; and
in the event the tag assigned to the object is the first tag value, displaying, in response to receiving the indication to tag the object, the tagged object in a second display window associated with objects that are assigned the first tag value.

23. A system as recited in claim 12, wherein the object is associated with one or more of the following: at least a portion of the image from which the object was detected, with a location in the image from which the object was detected, or a probability that the object includes a detection object.

* * * * *